(12) United States Patent
Ebisawa

(10) Patent No.: US 11,035,779 B2
(45) Date of Patent: Jun. 15, 2021

(54) PARTICLE CONTAINER AND PARTICLE FILLING APPARATUS

(71) Applicant: CANON KABUSHIKI KAISHA, Tokyo (JP)

(72) Inventor: Hisafumi Ebisawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 16/712,281

(22) Filed: Dec. 12, 2019

(65) Prior Publication Data

US 2020/0209142 A1    Jul. 2, 2020

(30) Foreign Application Priority Data

Dec. 26, 2018  (JP) .............................. JP2018-243764

(51) Int. Cl.
*G01N 15/14*  (2006.01)
*B01L 3/00*  (2006.01)

(52) U.S. Cl.
CPC .... *G01N 15/1484* (2013.01); *B01L 3/502761* (2013.01); *G01N 15/1404* (2013.01); *G01N 2015/1418* (2013.01)

(58) Field of Classification Search
CPC .............. G01N 15/14; G01N 15/1484; G01N 15/1404; G01N 2015/1418; B01L 3/502761
USPC ......................................................... 356/246
See application file for complete search history.

(56) References Cited

U.S. PATENT DOCUMENTS

| 4,290,997 A   * | 9/1981 | Suovaniemi ........... G01N 21/82 422/73 |
| 2019/0054466 A1* | 2/2019 | Gershtein .......... G01N 15/1436 |
| 2020/0102587 A1* | 4/2020 | Yokoi .................. B01L 3/5088 |

FOREIGN PATENT DOCUMENTS

WO        2008/146754 A1    12/2008

* cited by examiner

*Primary Examiner* — Roy M Punnoose
(74) *Attorney, Agent, or Firm* — Canon U.S.A., Inc. I.P. Division

(57) ABSTRACT

A particle container includes a measurement section in which a measurement region is formed and the measurement section measurably accommodates multiple particles in the measurement region. The measurement section is configured to change a width of the measurement region in the measuring direction of measuring the particles.

18 Claims, 13 Drawing Sheets

PARTICLE CONTAINER AND PARTICLE FILLING APPARATUS

BACKGROUND OF THE INVENTION

Field of the Invention

The present disclosure generally relates to a particle container and a particle filling apparatus.

Description of the Related Art

A testing (measuring) apparatus is available for performing fluorescence observation (fluorometry) or the like to evaluate a sample (particles) containing DNA or protein to be observed (measured). The sample is heated and reacted in a cartridge (particle container) of the testing apparatus.

International Publication No. 2008-146754 discloses a testing apparatus in which a sample is put in a cartridge formed of upper and lower flat plates and subsequently heated by pressing the cartridge against a heat source, and the heated sample is observed using an optical system.

Although International Publication No. 2008-146754 describes the fluorescence observation (fluorometry) carried out by using a liquid-droplet sample (particles), the width of the gap between the upper and lower plates during observation (measurement) is not specifically prescribed. This may lead to a situation where liquid droplets may be piled up during measurement and some droplets cannot be measured.

To address the situation, the width of the gap may be reduced to a size approximately equal to the diameter of the particles, which thereby prevents the particles from being piled up in the particle-measuring direction. In this case, however, a smaller width of the gap prolongs the time required for filling the particles, which poses another problem.

SUMMARY OF THE INVENTION

Accordingly, the present disclosure provides a particle container that includes a measurement section in which a measurement region is formed so as to measurably accommodate multiple particles, in which the time required for filling particles into the measurement region can be reduced.

The present disclosure provides a particle container including a measurement section in which a measurement region is formed and the measurement section measurably accommodates multiple particles in the measurement region. The measurement section is configured to change a width of the measurement region in the measuring direction of measuring the particles.

Further features of the present disclosure will become apparent from the following description of exemplary embodiments with reference to the attached drawings.

BRIEF DESCRIPTION OF THE DRAWINGS

FIGS. 6A to 6D are views for explaining problems to be solved with the embodiment, in which FIGS. 6A and 6B are cross-sectional views and FIGS. 6C and 6D each include an enlarged cross-sectional view and an enlarged top view.

FIGS. 7A to 7D are views illustrating types of width changing units and their operations according to the embodiment, in which FIGS. 7A and 7B are cross-sectional views, FIG. 7C is a perspective view, and FIG. 7D is a cross-sectional view.

FIG. 11C is an enlarged cross-sectional view.

DESCRIPTION OF THE EMBODIMENTS

An embodiment of the present disclosure will be described with reference to the drawings.

Note that dimensions, materials, shapes, relative positions, or the like, of elements described in the embodiments below are to be changed appropriately in accordance with configurations and various conditions of an apparatus to which the present disclosure is applied. Accordingly, the embodiments described below should not be construed as limiting the scope of the disclosure.

The present disclosure relates to a particle container (a cartridge) that accommodates spherical samples (particles) in a preliminary region (accommodation region) formed therein and that fills the spherical samples into an observation region (measurement region) of which the gap width in a measuring direction (particle observation direction) is set at a value related to the diameter of a particle.

In addition, the present disclosure relates to a particle filling apparatus for filling particles into the measurement region of the particle container for a short period of time and also relates to a measurement system that includes the particle filling apparatus.

Figure 1A:
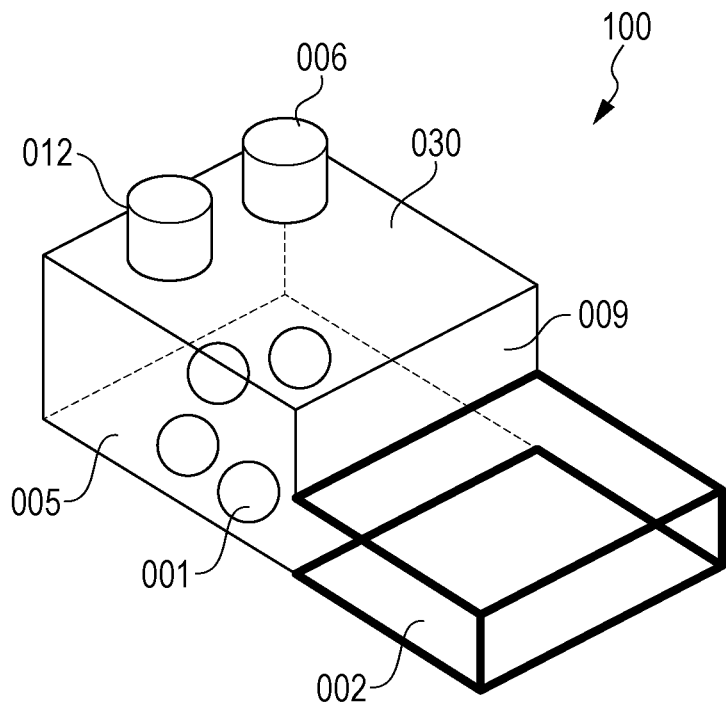
FIG. 1A is a perspective view illustrating an external appearance of a cartridge (particle container) according to an embodiment.
Figure 1B:
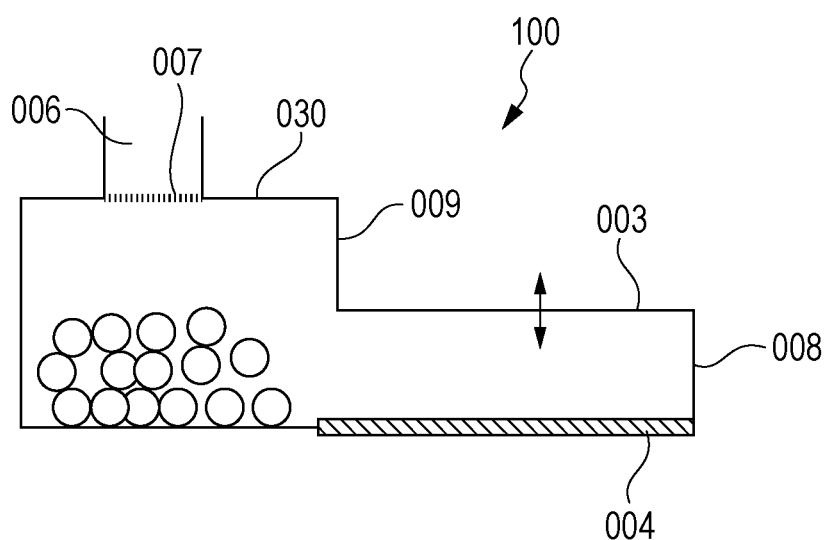
FIG. 1B is a cross-sectional view of the cartridge.

An example of a particle container and an example of a particle filling apparatus (and a measurement system including the particle filling apparatus) according to the present disclosure will be described with reference to FIGS. 1A, 1B and 4.

Configuration of Particle Container

First, a configuration of a particle container 100 will be described with reference to FIG. 1.

Reference 001 denotes a particle to be observed. Reference 002 denotes a measurement region in which particles 001 are placed during observation, in other words, the particles 001 are measurably accommodated.

The measurement region 002 is formed between an upper plate 003 and a lower plate 004, which serve as plates that oppose each other, and the measurement region 002 is configured such that the gap of the measurement region 002 is changeable by using an external force. Reference 008 denotes a side portion disposed between the upper plate 003 and the lower plate 004. A measurement section in which the measurement region 002 is formed is constituted at least by the upper plate 003, the lower plate 004, and the side portion 008.

Reference 005 denotes an accommodation region that accommodates particles 001 and is disposed next to the measurement region 002 so as to be in communication with the measurement region 002. The accommodation region 005 is configured to have a maximum height (a maximum width in the measuring direction) being at least greater than a maximum height of the measurement region 002. An accommodation section in which the accommodation region 005 is formed is constituted at least by the lower plate 004, a junction portion 009 (described later), and an opening-formed plate 030 (described later). The width of the accommodation region 005 in the measuring direction of measuring the particles 001 may be twice or more as large as the diameter of the particle 001. The accommodation section includes a liquid-droplet generation portion 007, which will be described later.

Reference 009 denotes a junction portion that is disposed between the accommodation region 005 and the upper plate 003 or the lower plate 004. Reference 006 denotes a sample inlet that allows a liquid sample to enter the accommodation region 005. Reference 007 denotes a liquid-droplet generation portion by which a liquid sample is transformed into particles 001. Reference 030 denotes an opening-formed plate in which the sample inlet 006 and an opening 012 (described later) are formed.

Accommodation Region

The accommodation region 005 accommodates multiple particles 001.

First, a liquid sample to be transformed into particles for observation (measurement) is poured into the accommodation region 005 through the sample inlet 006. Note that the sample inlet 006 can have a cover to prevent sample contamination.

The liquid sample poured is subsequently transformed into minute liquid droplets, which are particles 001, by the liquid-droplet generation portion 007. The liquid-droplet generation portion 007 may be formed of a porous glass membrane, an emulsification membrane having micro holes, or microchannels for generating liquid droplets. During generation of liquid droplets, it is necessary to cause the liquid sample and a continuous phase to flow. For this purpose, as illustrated in FIG. 4, it is desirable to form an opening 012 in the accommodation region 005 and connect a pump 015 (see FIG. 4) to the opening 012.

However, in the case of pouring, into the particle container 100, a sample such as resin beads or a sample that has already been made into droplets, it is not necessary to provide the liquid-droplet generation portion 007.

In the case of carrying out a polymerase chain reaction (PCR) by heating particles 001 in the accommodation region 005, the wall of the accommodation region 005 to be in contact with a heat source can have a structure having a high thermal conductivity. For example, if the heat source is disposed under the accommodation region 005, the floor plate in the accommodation region 005 may be made of a metal plate or a thin resin plate.

When the particles 001 are heated, the continuous phase may generate gas bubbles. The gas bubbles, which disturb observation of the particles 001, are desirably prevented from entering the measurement region 002. Accordingly, the height of the accommodation region 005 is made greater than a maximum height of the measurement region 002, and gas bubbles generated in the accommodation region 005 are thereby retained in the accommodation region 005.

Providing a space in the accommodation region 005 for storing entrapped gas bubbles is also effective in preventing gas bubbles from entering the measurement region 002.

Measurement Region

The measurement region 002 is formed between the upper plate 003 and the lower plate 004. The side portion 008 is provided between the upper plate 003 and the lower plate 004, thereby forming a container (measurement section) having the measurement region formed therein. The side portion 008 defines the width of the gap (i.e., the width between the upper plate 003 and the lower plate 004 in the measuring direction).

Note that the measurement region 002 is positioned adjacent to the accommodation region 005 and configured to take the particles 001 stored in the accommodation region 005 into the measurement region 002. The width of the gap between the upper plate 003 and the lower plate 004 can be changed by an external force. A mechanism for this will be described below with reference to FIGS. 2A to 2F.

Figure 2A:
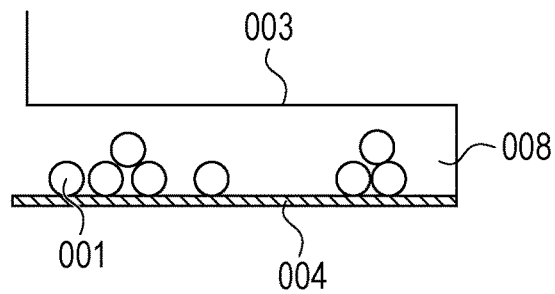
FIGS. 2A to 2F are cross-sectional views illustrating states of in which the gap width of a measurement region changes.

FIG. 2A is a cross section of the measurement section that forms the measurement region 002 to be filled with particles 001.

Figure 2B:
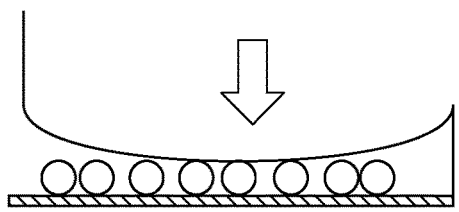
Figure 2C:
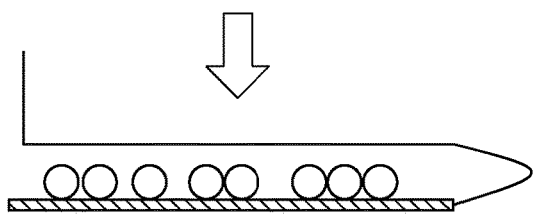

FIGS. 2B and 2C are cross-sectional views illustrating states in which an external force is applied to the measurement section of FIG. 2A. In FIG. 2B, the upper plate 003 has flexibility, and deformation of the upper plate 003 narrows the gap of the measurement region 002. In FIG. 2C, the side portion 008 has flexibility, and deformation of the side portion 008 narrows the gap of the measurement region 002.

The deformation is elastic. The structures and materials of the upper plate 003, the lower plate 004, and the side portion 008 are determined so as to deform in an expected manner. Note that when no external force is applied, the gap of the measurement region 002 is stably maintained as illustrated in FIG. 2A. It is also necessary to determine the structures and materials of the upper plate 003 and the side portion 008 accordingly.

Figure 2D:
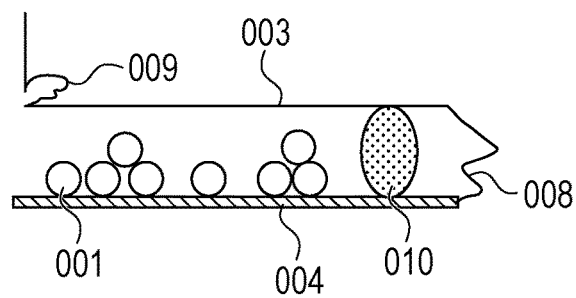

In FIG. 2D, the side portion 008 and the junction portion 009 that connect the upper plate 003 to other structures are made of a flexible material, and a first spacer 010 is disposed in the measurement region 002 that is the gap between the upper plate 003 and the lower plate 004. The first spacer 010 is made of a cushion material and defines the height of the upper pate 003.

Figure 2E:
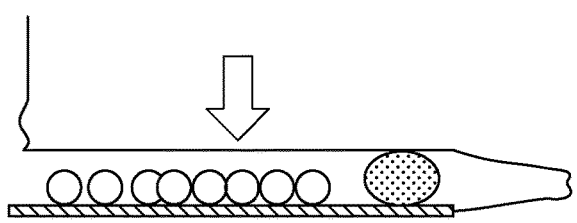

In FIG. 2E, an external force is applied to the accommodation section of FIG. 2D, which causes the first spacer 010 and the gap to deform. The first spacer 010 can be made of a rubber material, but compatibility with the continuous phase needs to be considered. Especially fluorocarbon rubber is compatible with various types of continuous phases.

In these structures, it is effective to provide a second spacer 011 made of a hard material for maintaining a desired width of the gap when the external force is applied. The second spacer 011 is disposed inside the measurement region 002 that is the gap between the first plate 003 and the second plate 004. Accordingly, the material of the second spacer 011 is such that the second spacer 011 does not deform by the external force and is not degraded by the continuous phase. Note that in FIG. 2F, the second spacer 011 is disposed on the lower plate 004, but the second spacer may be disposed on the upper plate 003.

Figure 2F:
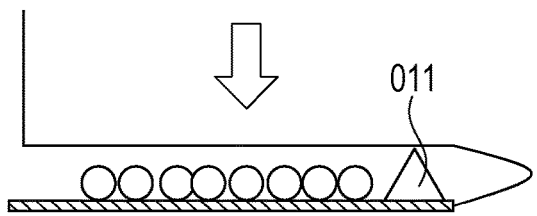

The second spacer 011 is desirably shaped as a structure having a sharp portion as illustrated in FIG. 2F. The sharp portion can move particles 001 easily away from the second spacer 011 when the gap is narrowed, which prevents the particles 001 from being crushed.

Particles 001 are a target object of optical measurement, such as fluorescence observation (fluorometry), in the measurement region 002. Accordingly, at least one of the upper plate 003 and the lower plate 004 is made of a light-transmissive material. For example, the light-transmissive material to be used may be glass, quartz, or a resin material, such as acrylic resin or polycarbonate. A resin can be used in the case of the material being subjected to deformation due to an external force.

Figure 3A:
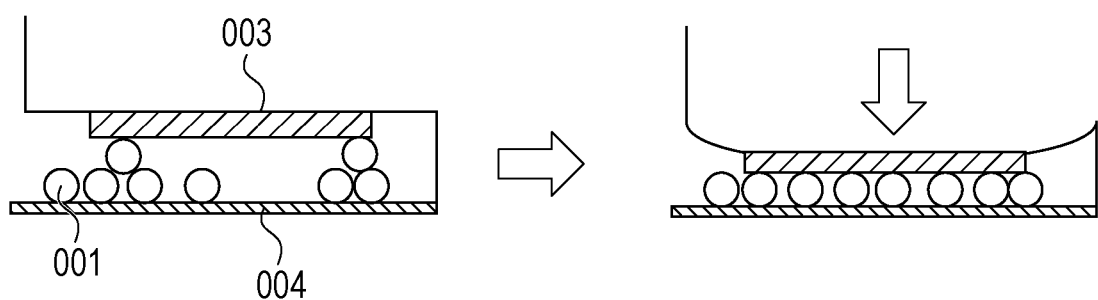
FIGS. 3A to 3D are cross-sectional views illustrating states in which the width of measurement region changes.
Figure 3B:
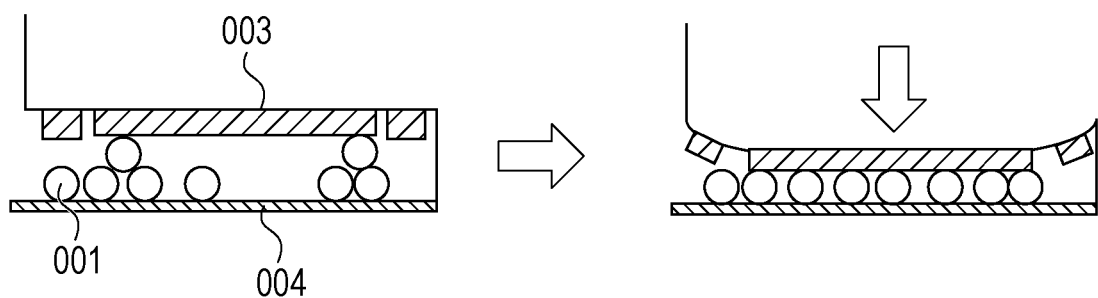
Figure 3C:
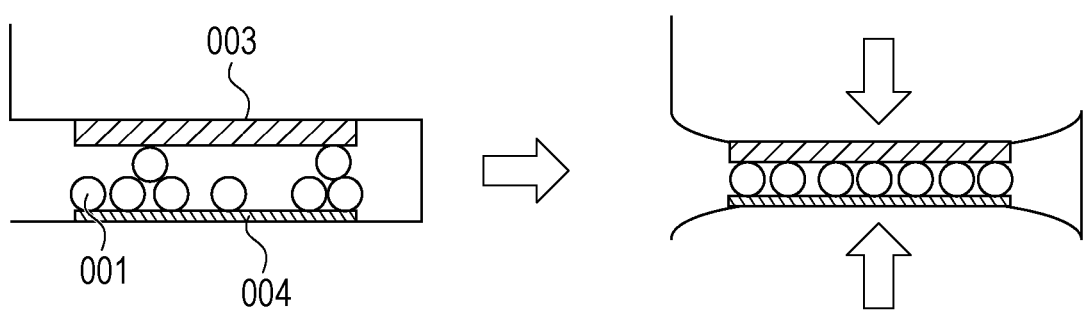
Figure 3D:
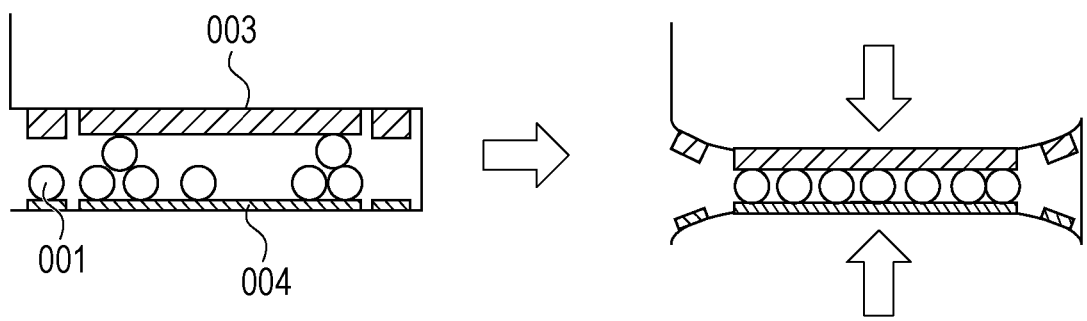

When the upper plate 003 deforms as illustrated in FIG. 2B, the area of the upper plate 003 where the width of the gap is constant can be large after the deformation of the measurement region 002. Devising the shape of the upper plate 003 leads to expansion of area of the upper plate 003 where the width of the gap is constant after the measurement region 002 deforms. For example, as illustrated in FIG. 3A, the thickness of the upper plate 003 in the measuring direction may be changed depending on positions on a surface of the upper plate 003 (on a surface orthogonally intersecting the measuring direction). More specifically, a peripheral portion of the upper plate 003 is made thinner than a central portion of the upper plate 003. Alternatively, as illustrated in FIG. 3B, a groove that deforms preferentially is formed in a circumferential portion of the upper plate 003. Different thickness portions (the thin portion or the groove-formed portion) may be provided only in the lower plate 004, instead of the upper plate 003, or, as illustrated in FIGS. 3C and 3D, may be provided both in the upper plate 003 and in the lower plate 004. In the case in which the different thickness portions are provided both in each of the upper plate 003 and in the lower plate 004 as illustrated in FIGS. 3C and 3D, width changing units (which will be described in detail later) may be provided to apply loads to the upper plate 003 and the lower plate 004, respectively. Alternatively, the width changing unit may be used to displace one of the upper plate 003 and the lower plate 004, and a different device other than the width changing unit may be used to displace the other one of the plates. The different device may be a member that has a certain thickness and is in contact with the other one of the plates. When a load is applied to one of the plates by the width changing unit, the other one of the plates can also receive a load as a reaction force from the member. This can eliminate the necessity of providing a plurality of the width changing units and can simplify the device for applying load, which leads to a reduction in the manufacturing cost of the particle filling apparatus and also in the maintenance and operation cost. The thicknesses of the upper plate 003 and the lower plate 004 may be appropriately determined so as to bear loads to be received. The thicknesses may be the same or may be different from each other.

When the upper plate 003 configured as such receives an external force, the gap width of the measurement region 002 can become substantially constant at the central portion thereof.

Particle Filling Apparatus

A particle filling apparatus and a measurement system 200 that includes the particle filling apparatus will be described with reference to FIG. 4.

Reference 013 is a holder base onto which a particle container is set and fixed. Reference 014 is a thermoregulator that changes the temperature of spherical samples in the particle container. Reference 015 is a pump to be used for transforming the liquid sample contained in the sample inlet portion into liquid droplets at the liquid-droplet generation portion 007. Reference 016 is a transport unit for transporting particles 001 placed in the accommodation region 005 toward the measurement region 002.

Reference 017 is a width changing unit that changes the width of the gap of the measurement region 002. Reference 018 is a camera for observation of particles 001 disposed in the measurement region 002. Reference 019 is a light source to be used for emitting light to the particles 001 when the particles 001 are observed (measured) by using the camera 018. These devices are actuated by a control unit 020.

First, the particle container is fixed onto the holder base 013. The particle container is subsequently filled with a liquid that serves as a continuous phase. Note that the particle container may be filled with the continuous phase in advance.

Next, a liquid sample to be measured is poured into the sample inlet 006. After the liquid sample is poured, the pump 015 is connected to the opening 012 and actuated. By actuating the pump 015, particles 001 are generated in the form of minute liquid droplets at the liquid-droplet generation portion 007 and stored in the accommodation region 005.

Instead of a typical pump, for example, a syringe pump may be used as the pump 015 by attaching a syringe to the opening 012. Note that in the case of the liquid-droplet generation portion 007 being microchannels, using a non-pulsation pump can generate liquid droplets of less variation in size.

The particles 001 can be heated by the thermoregulator 014. The polymerase chain reaction (PCR) can be carried out by subjecting the particles 001 to a temperature cycle between 60° C. and 90° C. A device that can regulate temperature, such as a Peltier element, can be used for the thermoregulator 014.

Figure 4:
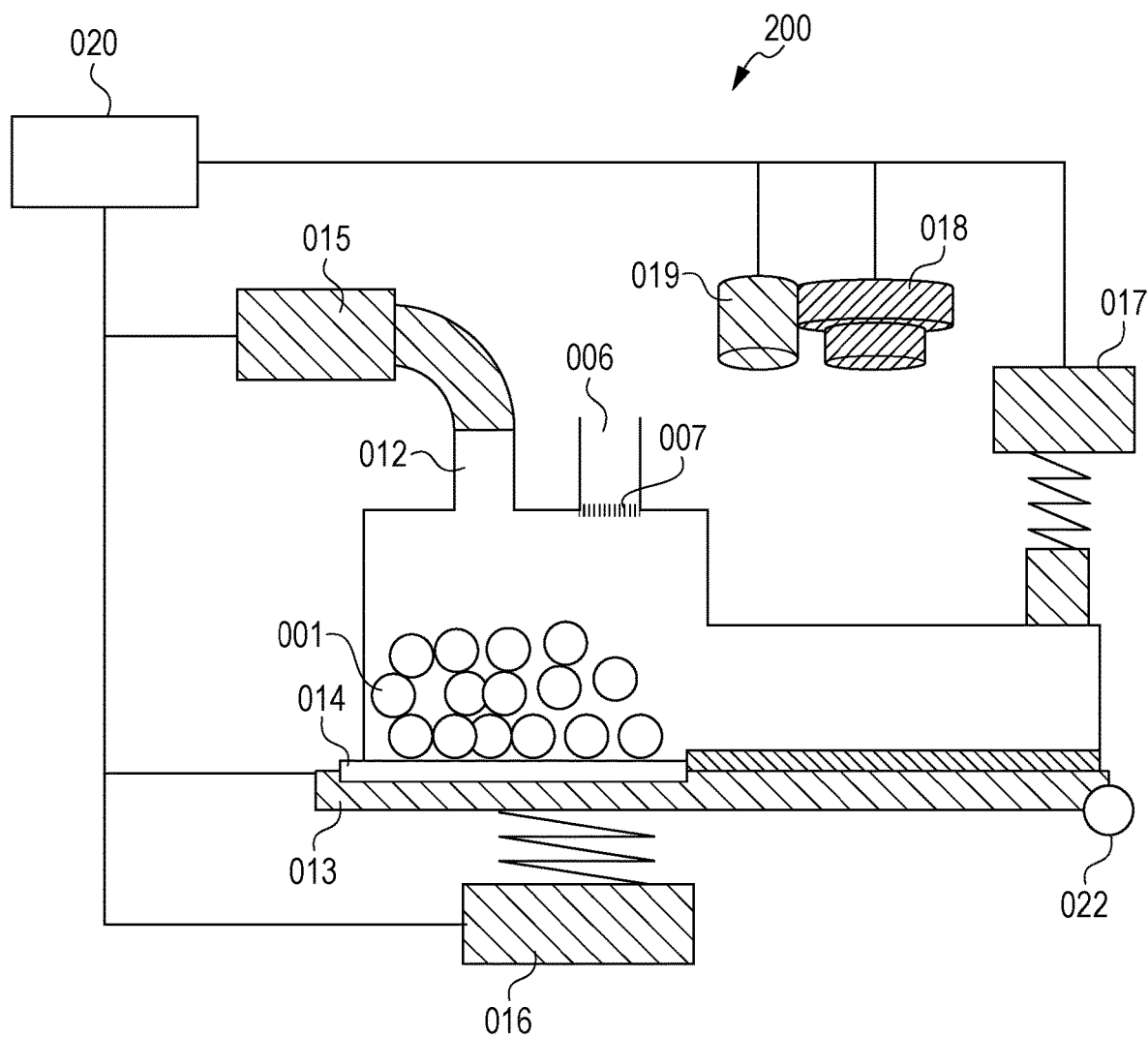
FIG. 4 is a general view illustrating a measurement system according to the embodiment, which, for example, fills spherical samples (minute particles).

The thermoregulator 014 is disposed on the floor plate in the accommodation region 005 in FIG. 4. However, the thermoregulator 014 may be disposed in the measurement region 002. This configuration is suitable for observation of the particles 001 in the condition of temperature change.

Alternatively, the thermoregulator 014 may be disposed both in the accommodation region 005 and in the measurement region 002 and may be selected suitably according to an application objective. For example, in a case in which PCR is carried out in the accommodation region 005 and a melting temperature is measured in the measurement region 002, the thermoregulator 014 in the measurement region may be capable of controlling temperature more precisely than the thermoregulator 014 in the accommodation region 005.

The particle filling apparatus at least includes the width changing unit 017. In addition, the particle filling apparatus may include the transport unit 016. The transport unit 016 transports the particles 001 toward the measurement region 002, and the width changing unit 017 changes the gap of the measurement region 002. This process will be described later.

The light source 019 emits light to the particles 001 placed in the measurement region 002, and the camera 018 takes an image of the particles 001. Note that light emitted by the light source 019 may be, for example, white light for taking an image of particles' external appearances or ultraviolet light for fluorescence observation (fluorometry), to be selected depending on an application objective.

In FIG. 4, the camera 018 and the light source 019 are disposed above the upper plate 003. However, the position is not limited to this. Moreover, a plurality of the light sources 019 and the cameras 018 may be provided.

These devices are controlled by the control unit 020 so as to automatically carry out a series of processing from pouring of the liquid sample.

Transport Unit

Next, the transport unit 016 will be described with reference to FIGS. 5A to 5D.

Figure 5C:
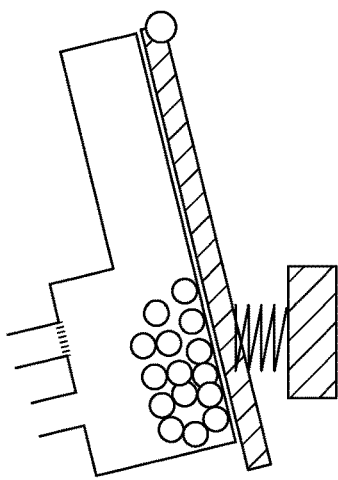
FIGS. 5A to 5D are cross-sectional views illustrating types of transport units and their operations according to the embodiment.
Figure 5B:
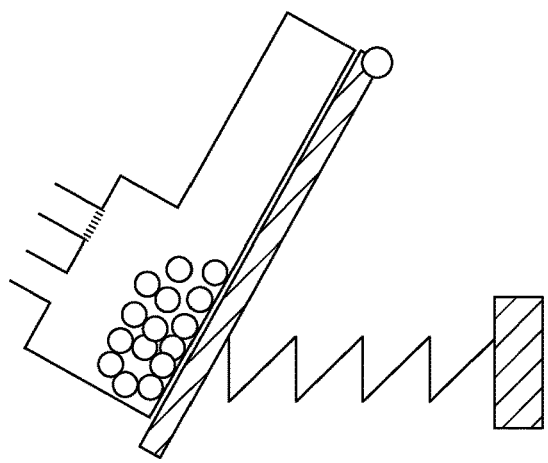
Figure 5A:
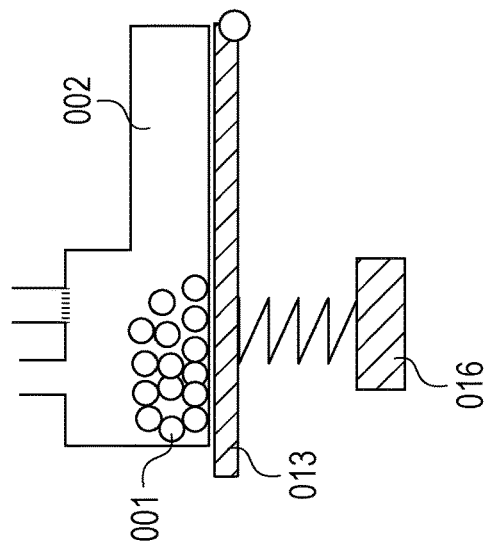

FIGS. 5A, 5B, and 5C illustrate an example in which a device that can incline the particle container is employed for the transport unit 016. FIG. 5B illustrates an example in which the specific gravity of the particles 001 is greater than that of the continuous phase, whereas FIG. 5C illustrates an example in which the specific gravity of the particles 001 is smaller than that of the continuous phase. The particles 001 can move toward the measurement region 002 by gravity. Heating of the thermoregulator 014 may generate gas bubbles in the particle container.

The gas bubbles, which disturb observation of the particles 001 using the camera 018, may be prevented from remaining in the measurement region 002. The gas bubbles can be treated when the transport unit 016 is actuated.

For example, in the case of the particles 001 having a larger specific gravity, the accommodation region 005 is raised to a higher position as illustrated in FIG. 5B, thereby moving the gas bubbles toward the accommodation region 005.

In the case of the particles 001 having a smaller specific gravity, the accommodation region 005 can be raised temporarily as illustrated in FIG. 5B, which causes the gas bubbles to move into the accommodation region 005 and causes the gas bubbles to be trapped in the opening 012 or a hollow such as the sample inlet 006. Consequently, the accommodation region 005 is lowered as illustrated in FIG. 5C, which causes the particles 001 to move to the measurement region 002. In order to collect the gas bubbles in the accommodation region 005 reliably, it is also effective to subject the particle container to an impact or vibrations so as to facilitate movement of the gas bubbles from the measurement region 002.

Figure 5D:
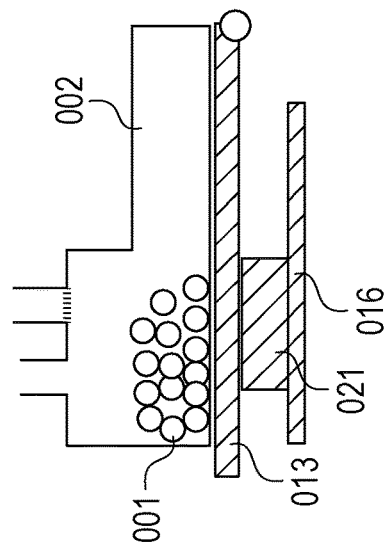

FIG. 5D illustrate an example in which a device that can move a magnet 021 between the accommodation region 005 and the measurement region 002 is employed for the transport unit 016. The particles 001 are moved using magnetism. Accordingly, the particles 001 need to be transportable by magnetism. For example, in the case of the liquid droplet, it is effective to mix minute magnetic particles in the liquid sample in advance.

Alternatively, it is also effective to adopt a rotation device for the transport unit 016, and the rotation device rotates the holder base 013, which produces centrifugal forces and thereby moves the particles 001 toward the measurement region 002. Note that when the specific gravity of the particles 001 is larger, the gas bubbles and the particles 001 move in directions opposite to each other, which facilitates movement of the gas bubbles from the measurement region 002 toward the accommodation region 005.

Width Changing Unit

Problems to be solved with the present embodiment will be described first with reference to FIGS. 6A to 6D, and then change of the gap width will be described with reference to FIGS. 7A to 7D.

Figure 6A:
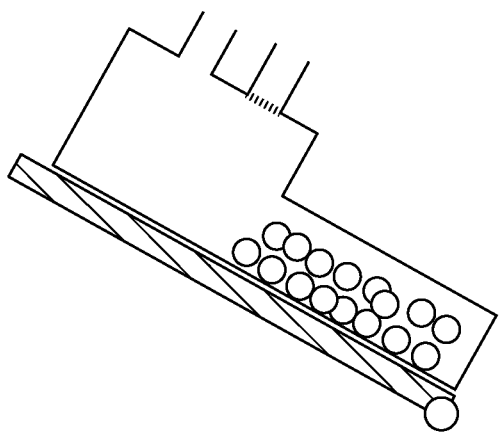

When the width of gap of the measurement region 002 is larger than the diameter of each particle 001, the particles 001 can move in the measurement region 002 easily, which is advantageous because the particles 001 can be filled into the measurement region 002 quickly (FIG. 6A).

Figure 6B:
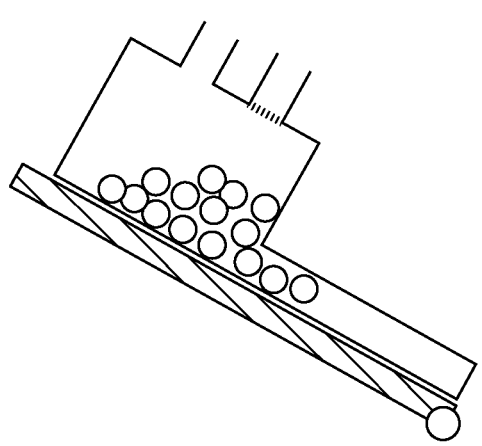
Figure 6C:
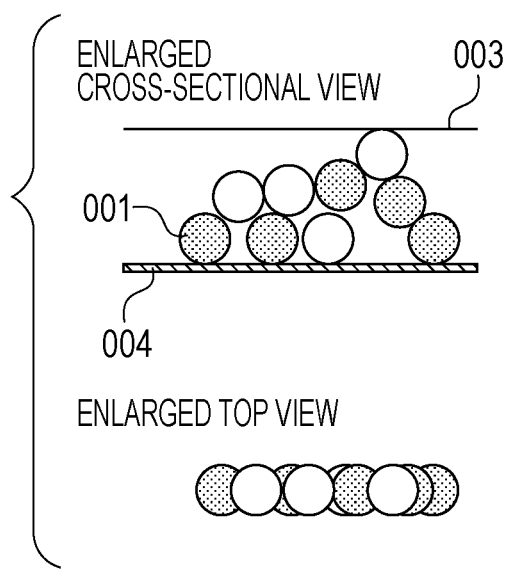
Figure 6D:
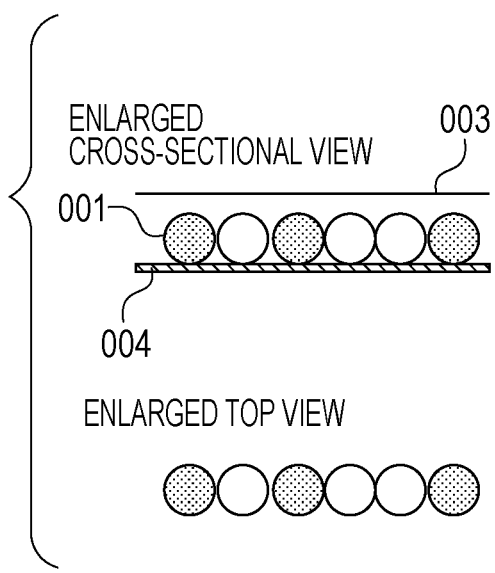

However, the particles 001 may pile up in the measurement region 002, causing some particles 001 not to be observed from the camera 018 (FIG. 6C). This problem can be solved by limiting the width of the gap to a level corresponding to the diameter of each particle 001 and by arranging the particles 001 in one layer (FIG. 6D).

However, this makes it difficult to fill the particles 001 quickly into such a narrow gap because of clogging of the particles 001 and the continuous phase (FIG. 6B).

The width changing unit 017 operates to avoid such a problem. First, the transport unit 016 is actuated when the gap is wide as illustrated in FIG. 6A and thereby causes the particles 001 to move quickly into the measurement region 002.

Figure 7A:
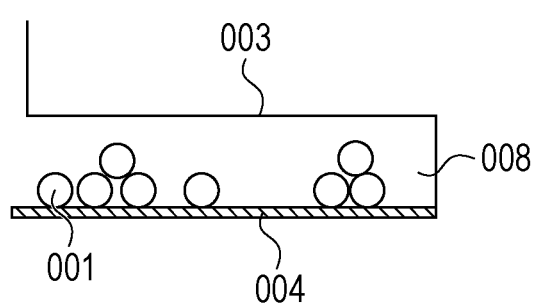
Figure 7B:
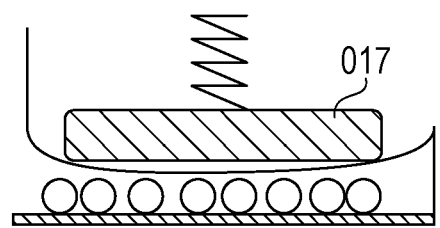

FIG. 7A illustrates a state of the measurement region 002 after the particles 001 are transported. A single axis actuator is used to press the width changing unit 017 against the upper plate 003 and thereby narrow the gap. This causes the particles 001 to be arranged in one layer. A linear stage may be used as the single axis actuator. However, the width changing unit 017 is not limited to the single axis actuator insofar as the width of the gap can be changed.

Figure 7C:
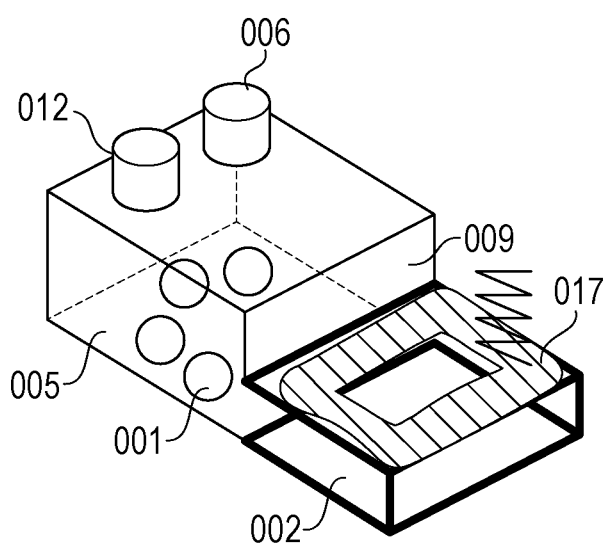
Figure 7D:
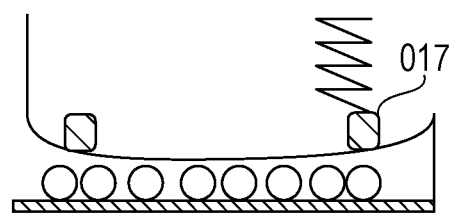

Note that it is also effective to shape the contact portion of the width changing unit 017 into a hollow shape as illustrated in FIGS. 7C and 7D. In this case, only the peripheral portion is masked. Accordingly, light can be emitted and photographs can be taken from above the upper plate 003.

In addition, it is also effective to take the particles 001 into the measurement region 002 after widening the gap instead of narrowing the gap after the particles 001 are taken into the measurement region 002.

Figure 8A:
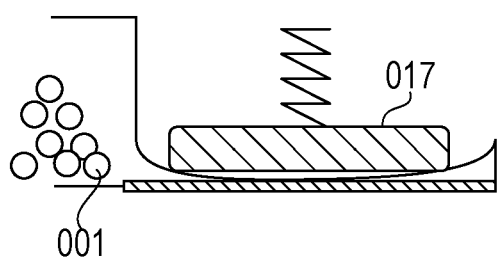
FIGS. 8A to 8C are cross-sectional views illustrating an operation example of the transport unit and the width changing unit according to the embodiment.
Figure 8B:
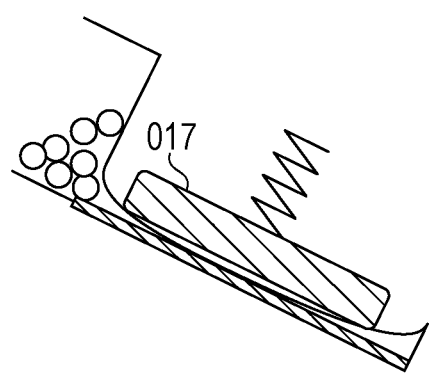
Figure 8C:
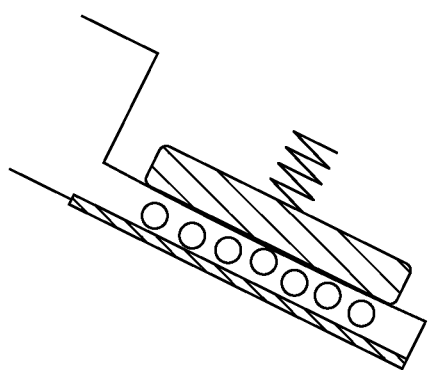

As illustrated in FIG. 8A, the measurement region 002 of which the gap is narrowed in advance is provided. As illustrated in FIGS. 8B and 8C, the particles 001 is moved into the measurement region 002 by actuating the transport unit 016. Subsequently, the gap is widened by actuating a gap control unit. The particles 001 collected at the entrance of the measurement region 002 can be thereby taken into the measurement region 002. As a result, the measurement region 002 can be filled with the particles 001 quickly, and gas bubbles generated in the accommodation region 005 during heating can be prevented from entering the measurement region 002.

In the case of the particles 001 being liquid droplets, static electricity may be generated during changing of the gap width, causing aggregation of liquid droplets. Especially in the case of the cartridge housing made of a resin, this tends to occur. To solve this problem, it is effective to connect to ground the particle container, the holder base 013, or a contact portion of the gap actuator unit to be in contact with the particle container, or all of these.

Figure 9A:
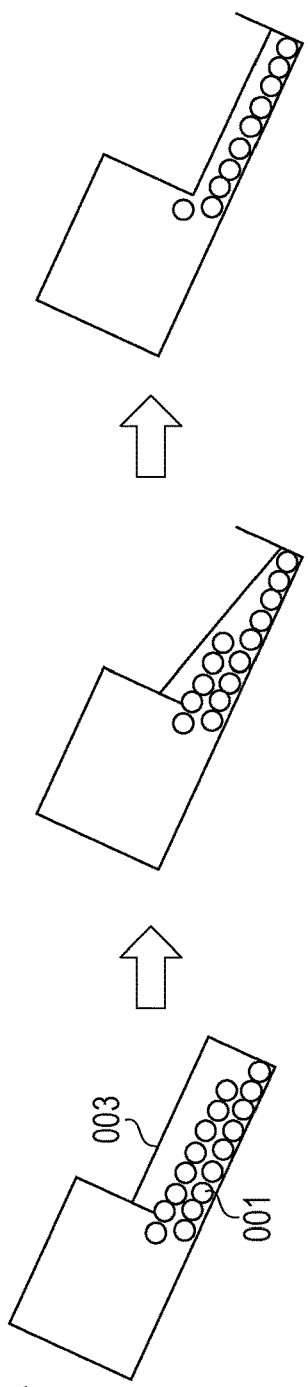
FIGS. 9A to 9D are cross-sectional views illustrating operation examples of the width changing unit according to the embodiment and also illustrating examples of width changing units that enable the operation.

It is also effective to devise a method of controlling the width changing unit 017 so as to arrange liquid droplets in one layer smoothly. In the case in which the gap width is changed after the measurement region 002 is filled with the particles 001 as is the example illustrated in FIGS. 7A to 7D, the gap is narrowed progressively from the lowest portion of the measurement region 002 in FIG. 9A. The particles 001 can be thereby arranged in one layer in the measurement region 002 without the particles 001 being clogged.

Figure 9B:
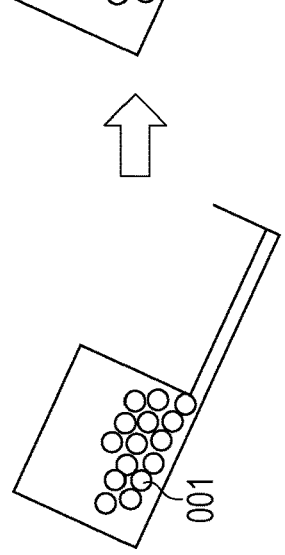

In addition, when the gap is widened to take in the particles 001, the gap is widened progressively from a portion of the measurement region 002 near the accommodation region 005 as illustrated in FIG. 9B. The particles 001 can be thereby taken smoothly into the measurement region 002.

Figure 9C:
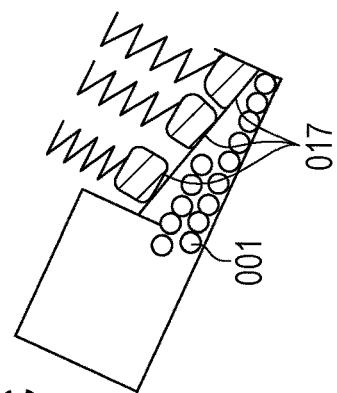
Figure 9D:
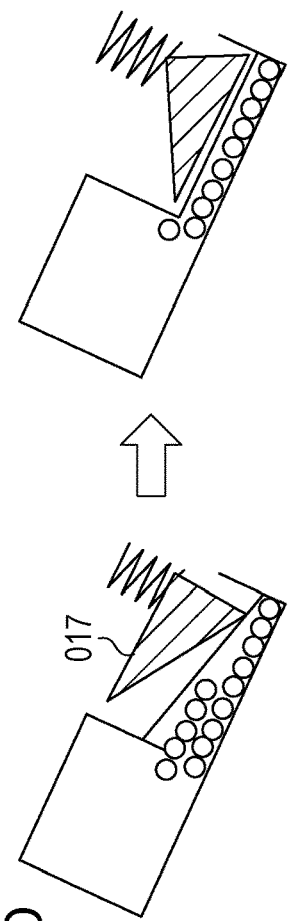

To implement this type of control, multiple actuators may be provided for the width changing unit 017 as illustrated in FIG. 9C. The multiple actuators apply pressure on a portion of the measurement region 002 near the accommodation region 005 and on a deeper portion of the measurement region 002 at different timings. Alternatively, as illustrated in FIG. 9D, it is also effective that the contact portion of the width changing unit 017 has a shape projecting toward a portion of the upper plate 003 located deeper in the measurement region 002. The upper plate 003 is pressed progressively from the deeper portion toward the accommodation region 005.

There has been described an example in which the width changing unit 017 directly presses and deforms the upper plate 003 (or the peripheral portion of the upper plate 003) that defines the measurement region 002. However, the width changing unit 017 is not limited to this configuration. For example, a negative pressure or a positive pressure is applied in the particle container in advance. The width changing unit 017 releases the pressure inside the particle container, which can change the gap of the measurement region 002.

Figure 10A:
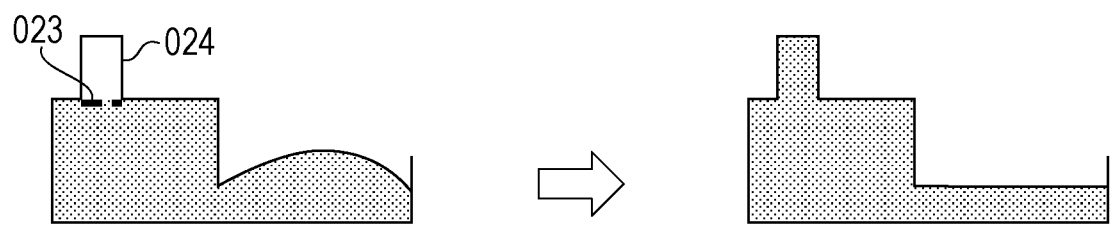
FIGS. 10A to 10C are cross-sectional views illustrating operation examples of the width changing unit according to the embodiment and also illustrating an example of a particle container that enables the operation.
Figure 10B:
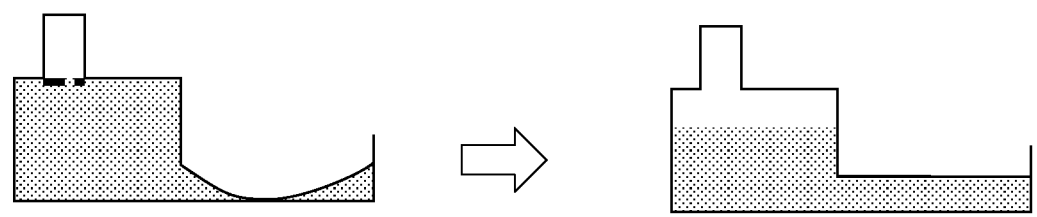

For example, particles 001 are stored in the accommodation region 005. Subsequently, the upper plate 003 is deformed due to the pump 015 or the like applying a positive pressure or a negative pressure. The airtight particle container is maintained with the gap being changed. The particle container is shaped as illustrated in FIG. 10A when a positive pressure is applied inside the particle container, and the particle container is shaped as illustrated in FIG. 10B when a negative pressure is applied. The particle container includes a headspace portion 024 communicating with the accommodation region 005 and a release plug 023 that plugs the headspace portion 024 and the accommodation region 005. When the width changing unit 017 actuates the release plug 023, the pressure in the particle container is released, thereby causing the upper plate 003 to return to its original shape and change the gap.

Figure 10C:
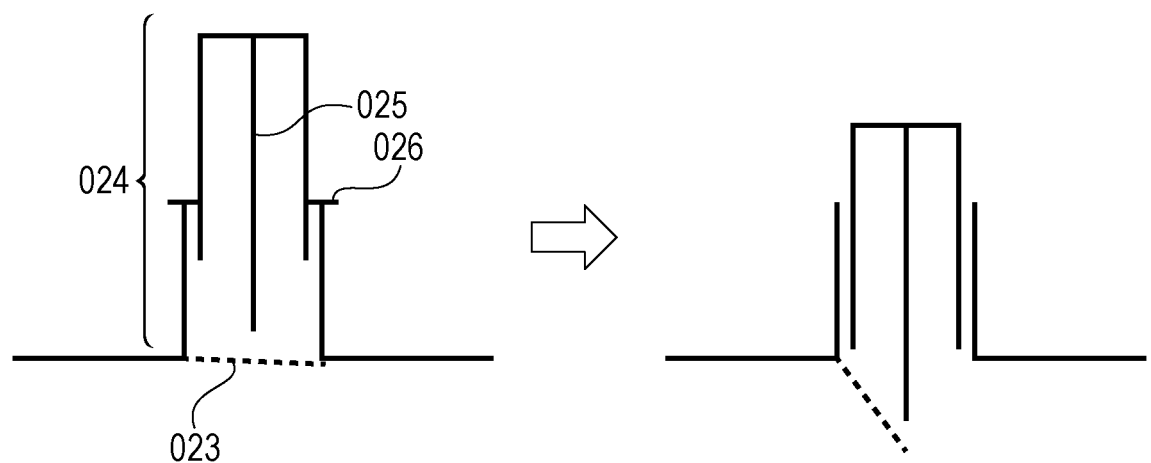

FIG. 10C illustrates an opening state of the release plug 023. The headspace portion 024 has the opening 012 that is formed at the particle container and has an edge. The headspace portion 024 also has a plug that is movable upward and downward and is disposed so as to plug the opening 012. The plug includes a projection 025 for opening the release plug 023 and a stopper 026 that stops movement of the projection 025 so as to prevent the projection 025 from opening the release plug 023 during normal operation. The plug has a sealing member that prevents the continuous phase from releasing out of the particle container when the release plug 023 is open.

Any type of device can be employed in the gap control unit insofar as the device can release the stopper 026 and opens the release plug 023. For example, a linear type motor can be used.

Width of Gap After Change

Figure 11A:
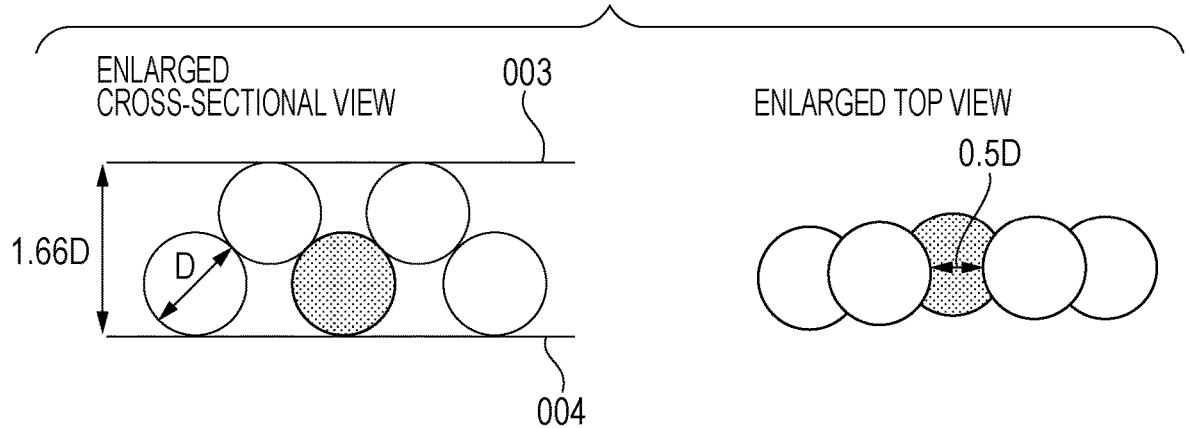
FIGS. 11A to 11C are views for explaining about the diameter of a spherical sample and the change of the width, in which FIGS. 11A and 11B each include an enlarged cross-sectional view and an enlarged top view

The width of the gap after the gap is changed is desirably set at a value approximately equal to or more than the diameter of each particle 001. For example, in the case of the width of the gap being 1.66 times more than the diameter, as illustrated in FIG. 11A, at least a one half of the diameter portion or more of a particle 001 can be observed from the camera 018 even if the particles 001 are stacked. Fluorescence observation (fluorometry) can be carried out if such an amount of portion of each particle 001 is observable (measurable).

Figure 11B:
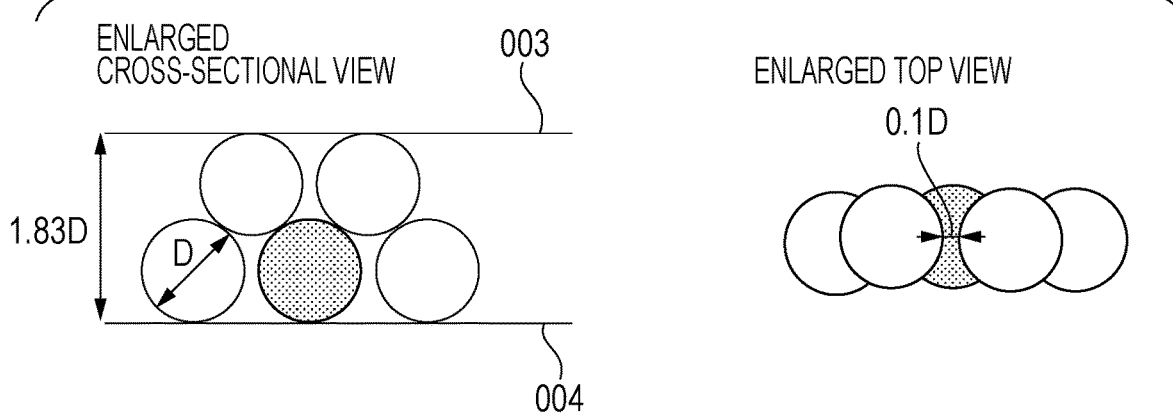

The fluorescence observation can be still carried out even if a less portion of each particle 001 than the above is observable in a case in which the diameter of each particle 001 is large and the camera 018 is capable of large magnification. For example, as illustrated in FIG. 11B, even if the width of the gap exceeds 1.83 times of the diameter, a central 10% portion of the diameter of a particle 001 can be still imaged. If the width of the gap is twice the diameter or more, the central portion of a particle 001 may not be imaged when the particles 001 are stacked. Accordingly, the width of the gap can be equal to or less than twice the diameter.

Figure 11C:
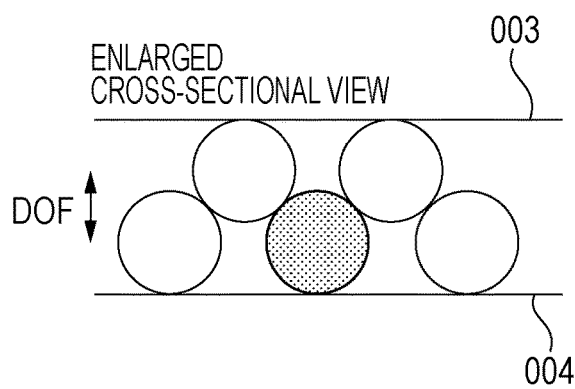

In the case of observing the external appearance of each particle 001, it is necessary to observe outlines of upper particles 001 and lower particles 001. As illustrated in FIG. 11C, when the depth of field of the camera 018 is DOF1, the width of the gap need to be reduced to the diameter+DOF1 or less.

All the particles 001 in the particle container may not necessarily be in the same size. Here, the diameter of the particles 001 can be defined as a maximum diameter of particles 001 of a central 95% portion in the size distribution of the particles 001 contained in the particle container.

As described above, the width of the gap can be prescribed with respect to the particle diameter in accordance with an application objective, which enables the camera 018 to obtain information of the particles 001 in line with the objective.

First Embodiment

The following describes configurations of a particle container according to a first embodiment, of a particle filling apparatus, and of a measurement system that includes the particle filling apparatus. In the drawings, the same elements are denoted by the same references, and duplicated descriptions will be omitted.

FIG. 1 schematically illustrates a configuration of a particle container according to the present embodiment. All the components of the particle container are made of polycarbonate except for the liquid-droplet generation portion 007. Sheet members and members manufactured using injection molding are assembled using an adhesive or a joining technology. In the present embodiment, the floor plate of the accommodation region 005 and the lower plate 004 are formed of one sheet member, and other portions of the housing are manufactured using injection molding. Note that a 0.2 mm thick sheet is adopted to facilitate heat conduction.

A porous membrane made of silicon by using photo-processing is used as the liquid-droplet generation portion 007. The porous membrane has a large number of equally shaped through-holes, and the surface of the porous membrane is subjected to hydrophobic treatment. The porous membrane is disposed so as to cover the sample inlet 006 and adhered thereto. The sheet member and the member to which the porous membrane is adhered are joined to each other so as to form a container.

Threads for connection with various connectors are formed at the sample inlet 006 and the opening 012, which enables connection with the pump 015 and sealing by using a lid.

The shape of each hole of the porous membrane is adjusted so as to be able to produce liquid droplets of approximately 100 μm in diameter when the sample passes through the holes. Note that the height of the accommodation region 005 is designed to be 500 μm and the height (i.e., width) of the measurement region 002 is designed to be 400 μm.

FIG. 4 is a diagram schematically illustrating a configuration of a filling system of particles 001 according to the present embodiment.

The holder base 013 is formed of a metal plate, and the particle container can be fixed thereto. The holder base 013 is equipped with a rotation shaft 022 that enables the holder base 013 to incline. The particle container fixed to the holder base 013 is filled with an oil that serves as the continuous phase.

After the particle container is set on the holder base 013, a syringe is installed in the opening 012, and the syringe is connected to a syringe pump, which serves as the pump 015. An aqueous liquid sample is poured into the sample inlet 006, and then the syringe pump is actuated. This causes the liquid sample to pass through the liquid-droplet generation portion 007. As a result, a large number of liquid droplets are generated in the accommodation region 005. The syringe is removed after the generation of the liquid droplets, and the particle container is sealed with lids covering the opening 012 and the sample inlet 006.

The syringe may be utilized in place of a lid. It is effective to automate installation of the syringe, connection or disconnection of the pump 015, pouring of the liquid sample, and installation of a lid. After the particle container is sealed, the liquid droplets are heated by actuating the Peltier element that serves as the thermoregulator 014. Note that in the case of performing PCR, the liquid droplets are subjected several times to a temperature cycle between 60° C. and 90° C.

After the heat treatment, the holder base 013 is inclined by actuating a linear type motor that serves as the transport unit 016. Note that since the specific gravity of the liquid sample is greater than that of the oil in this case, the liquid droplets move toward the measurement region 002 by inclining the holder base 013. Note that the diameter of each liquid droplet is 100 μm, whereas the width of the gap of the measurement region 002 is 400 μm, which is large enough to take in the liquid droplets quickly.

After the measurement region 002 is filled with the liquid droplets, the gap of the measurement region 002 is narrowed by actuating the linear type motor that serves as the width changing unit 017 and by deforming the upper plate 003. Note that the contact portion of the width changing unit 017 to be in contact with the upper plate 003 is shaped so as to have a hollow at the center as illustrated in FIGS. 7C and 7D. Note that the hollow region becomes an observation region. The gap actuator unit is controlled to cause the width of the gap in the hollow region to be 266 mm or less, which is 1.66 times greater than the diameter of each liquid droplet. As a result, the liquid droplets are arranged in one layer in the observation region.

After the liquid droplets are arranged in one layer, the light source 019 emits ultraviolet light, and the fluorescence observation is performed using the camera 018. Thus, all the liquid droplets present within the observation region can be observed.

In the present embodiment, as described above, multiple particles 001 to be observed are put in the particle container that can change the width of gap of the measurement region 002. After the particles 001 are filled into the measurement region 002, the width of gap of the measurement region 002 is changed approximately to the diameter of each particle 001. This enables the particles 001 to be arranged in one layer in a short period of time.

Second Embodiment

Operation of a particle container and a gap control unit according to the second embodiment will be described. In the drawings, the same elements are denoted by the same references, and duplicated descriptions will be omitted. In addition, elements other than the particle container and the gap control unit are the same as those described in the first embodiment, and duplicated descriptions will be omitted.

Figure 12:
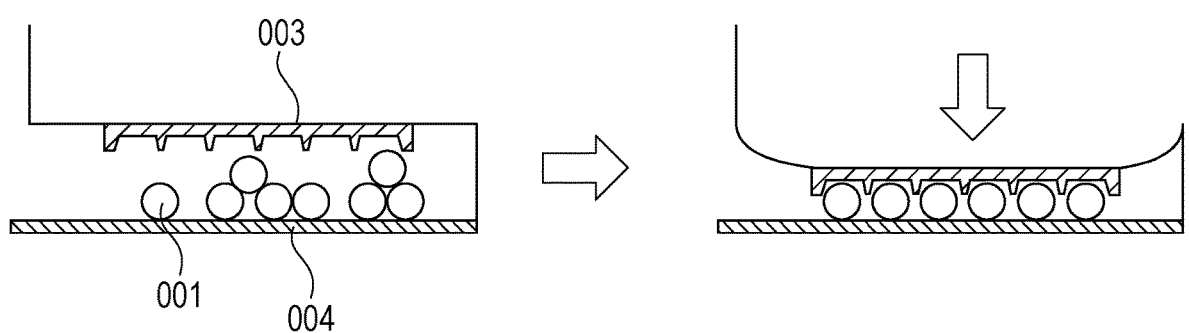
FIG. 12 is a cross-sectional view illustrating a particle container according to a second embodiment.

FIG. 12 schematically illustrates a configuration of a particle container according to the present embodiment. A large number of dents each having a size similar to the diameter of each liquid droplet are formed in a central portion of the upper plate 003. The dents open toward the inside of the particle container. After the liquid droplets are moved into the measurement region 002 by the transport unit 016, the width changing unit 017 deforms the upper plate 003 and thereby causes liquid droplets to enter the dents and to be settled therein.

Note that the width of gap of the measurement region 002 after the gap is changed can be set such that the distance between the protrusions of the upper plate 003 and the lower plate 004 is smaller than the diameter of each liquid droplet. Movement of each liquid droplet is thereby prevented by the dent, which facilitates identification of each liquid droplet during observation using the camera 018.

In the present embodiment, using the above-described cartridge and system enables the particles 001 to be filled quickly into the measurement region 002 in one layer and also enables the particles 001 to be prevented from moving.

In a particle container that includes a measurement section in which a measurement region is formed so as to measurably accommodate multiple particles, the time required for filling multiple particles into the measurement region can be reduced.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-243764, filed Dec. 26, 2018, which is hereby incorporated by reference herein in its entirety.

What is claimed is:

1. A particle container comprising:
   a measurement section in which a measurement region is formed, and the measurement section measurably accommodates multiple particles in the measurement region,
   wherein the measurement section includes plates that oppose each other, and a side portion disposed between the plates, and
   wherein the measurement section is configured such that a thickness of at least one of the plates in a measuring direction of measuring the particles is made different at positions on a surface of the at least one of the plates, the surface orthogonally intersecting the measuring direction, which thereby enables a width of the measurement region in the measuring direction to change.

2. The particle container according to claim 1, wherein the measurement section is configured such that the thickness of the at least one of the plates in the measuring direction is smaller in a peripheral portion of the surface orthogonally intersecting the measuring direction than in a central portion of the surface orthogonally intersecting the measuring direction.

3. The particle container according to claim 1, wherein the width of the measurement region in the measuring direction is changeable in a range not less than a diameter of each particle and not more than twice the diameter.

4. The particle container according to claim 1, further comprising:
a spacer that is disposed between the plates that oppose each other and that defines a lower limit of the width of the measurement region in the measuring direction.

5. The particle container according to claim 4, wherein the spacer is made of a hard material and has a sharp portion.

6. The particle container according to claim 1, further comprising:
an accommodation section in which an accommodation region is formed, and the accommodation section accommodates the particles in the accommodation region that communicates with the measurement region,
wherein a width of the accommodation region in the measuring direction is twice a diameter of each particle or more.

7. The particle container according to claim 6, wherein the accommodation section includes a liquid-droplet generation portion that transforms a liquid sample into the particles.

8. A particle container comprising:
a measurement section in which a measurement region is formed and the measurement section measurably accommodates multiple particles in the measurement region,
wherein the measurement section includes plates that oppose each other, and a side portion disposed between the plates, and
wherein the measurement section is configured such that the side portion is flexibly deformable in a measuring direction of measuring the particles and thereby enables a width of the measurement region in the measuring direction to change.

9. The particle container according to claim 8, wherein the width of the measurement region in the measuring direction is changeable in a range not less than a diameter of each particle and not more than twice the diameter.

10. The particle container according to claim 8, further comprising:
a spacer that is disposed between the plates that oppose each other and that defines a lower limit of the width of the measurement region in the measuring direction.

11. The particle container according to claim 10, wherein the spacer is made of a hard material and has a sharp portion.

12. The particle container according to claim 8, further comprising:
an accommodation section in which an accommodation region is formed, and the accommodation section accommodates the particles in the accommodation region that communicates with the measurement region,
wherein a width of the accommodation region in the measuring direction is twice a diameter of each particle or more.

13. The particle container according to claim 12, wherein the accommodation section includes a liquid-droplet generation portion that transforms a liquid sample into the particles.

14. A particle filling apparatus comprising:
a particle container including,
a measurement section in which a measurement region is formed, and the measurement section measurably accommodates multiple particles in the measurement region,
wherein the measurement section includes plates that oppose each other, and a side portion disposed between the plates, and
wherein the measurement section is configured such that a thickness of at least one of the plates in a measuring direction of measuring the particles is made different at positions on a surface of the at least one of the plates, the surface orthogonally intersecting the measuring direction, which thereby enables a width of the measurement region in the measuring direction to change; and
a width changing unit that changes the width of measurement region of the particle container in the measuring direction.

15. The particle filling apparatus according to claim 14, wherein the width changing unit changes the width of the measurement region in a range not less than a diameter of each particle and not more than twice the diameter.

16. The particle filling apparatus according to claim 14, wherein of a central portion and a peripheral portion of the surface orthogonally intersecting the measuring direction, the width changing unit applies pressure only on the peripheral portion or releases pressure only from the peripheral portion.

17. The particle filling apparatus according to claim 14, wherein the particle container further includes
an accommodation section in which an accommodation region is formed, and the accommodation section accommodates the particles in the accommodation region that communicates with the measurement region,
wherein a width of the accommodation region in the measuring direction is twice a diameter of each particle or more;
wherein the particle filling apparatus further comprises a transport unit that moves the particles accommodated in the accommodation region of the particle container to the measurement region.

18. The particle filling apparatus according to claim 17, wherein the particle filling apparatus causes the transport unit to move the particles and subsequently causes the width changing unit to change the width of the measurement region, and
wherein the particle filling apparatus further causes the width changing unit to change the width of the measurement region in the range not less than the diameter of each particle and not more than twice the diameter.

* * * * *